US008411653B2

(12) United States Patent
Ito

(10) Patent No.: US 8,411,653 B2
(45) Date of Patent: Apr. 2, 2013

(54) RECEIVING APPARATUS AND RECEIVING METHOD

(75) Inventor: Osamu Ito, Tokyo (JP)

(73) Assignee: Sony Corporation, Tokyo (JP)

(*) Notice: Subject to any disclaimer, the term of this patent is extended or adjusted under 35 U.S.C. 154(b) by 428 days.

(21) Appl. No.: 12/469,180

(22) Filed: May 20, 2009

(65) Prior Publication Data
US 2009/0290566 A1  Nov. 26, 2009

(30) Foreign Application Priority Data

May 23, 2008  (JP) .............................. P2008-135970

(51) Int. Cl.
*H04W 4/00* (2009.01)
(52) U.S. Cl. .......................... 370/338; 370/208; 370/334
(58) Field of Classification Search ........................ None
See application file for complete search history.

(56) References Cited

U.S. PATENT DOCUMENTS

| 7,466,667 | B2 | 12/2008 | Jones, IV et al. | |
|---|---|---|---|---|
| 7,562,277 | B2* | 7/2009 | Park et al. | 714/748 |
| 7,599,332 | B2 | 10/2009 | Zelst et al. | |
| 2003/0072284 | A1* | 4/2003 | Webster et al. | 370/335 |
| 2003/0161428 | A1* | 8/2003 | Garrett et al. | 375/368 |
| 2004/0032825 | A1* | 2/2004 | Halford et al. | 370/208 |
| 2005/0180315 | A1* | 8/2005 | Chitrapu et al. | 370/208 |
| 2006/0227700 | A1* | 10/2006 | Kubota et al. | 370/208 |
| 2007/0230403 | A1* | 10/2007 | Douglas et al. | 370/334 |
| 2009/0207767 | A1 | 8/2009 | Hirsch | |

FOREIGN PATENT DOCUMENTS

| JP | 2006-295464 | 10/2006 |
|---|---|---|
| JP | 2006-295465 | 10/2006 |
| JP | 2007-523573 | 8/2007 |
| JP | 2008-005115 | 1/2008 |
| JP | 2008-500783 | 1/2008 |
| JP | 2008-512029 | 4/2008 |

* cited by examiner

*Primary Examiner* — Ian N Moore
*Assistant Examiner* — Brian T Le
(74) *Attorney, Agent, or Firm* — Finnegan, Henderson, Farabow, Garrett & Dunner, L.L.P.

(57) ABSTRACT

There is provided a receiving apparatus including a radio receiving section that receives a first radio signal transmitted according to a first communication system and a second radio signal transmitted according to a second communication system, a first detection section that detects the first radio signal among radio signals received by the radio receiving section, a second detection section that detects the second radio signal among radio signals received by the radio receiving section using a predetermined correlation threshold, and a threshold control section that temporarily changes the correlation threshold of the second detection section when the first radio signal is detected by the first detection section.

14 Claims, 10 Drawing Sheets

RECEIVING APPARATUS AND RECEIVING METHOD

BACKGROUND OF THE INVENTION

1. Field of the Invention

The present invention relates to a receiving apparatus and a receiving method.

2. Description of the Related Art

When wireless communication is performed, various communication systems are generally used in accordance with a purpose of communication and restrictions of communication environments. The OFDM (Orthogonal Frequency Division Multiplexing) system, for example, is a communication system by which a signal modulated into many carrier waves which are orthogonal to each other and multiplexed is transmitted. One advantage of the OFDM system is being resistant to interference and the OFDM system is used for standard specifications of IEEE802.11a and n and the like. The DSSS (Direct Sequence Spread Spectrum) system is a communication system by which energy of a signal is spread over a wide frequency band for transmission. One advantage of the DSSS system is a speedup of communication by spreading and the DSSS system is used for standard specifications of IEEE802.11b and the like.

Under such circumstances, a plurality of different communication systems may be used in overlapping communication areas or overlapping communication frequencies in a coexisting situation. Thus, in recent years, development of a receiving apparatus having a so-called "double wait" functionality which is capable of receiving two or more radio signals based on different communication systems have been promoted.

With a receiving apparatus for double wait, there arises an issue of erroneous detection that a radio signal according to one communication system is erroneously detected as a signal according to another communication system. Thus, Japanese Unexamined Patent Application Publication (Translation of PCT Application) No. 2007-523573, for example, proposes a technique to determine whether or not detection is erroneous after a signal received by one communication system being modulated to adaptively adjust a detection process. Japanese Patent Application Laid-Open No. 2006-295464 discloses a technique that supports both the OFDM system and the DSSS system for double wait and changes detection criteria of radio signal in the DSSS system depending on detection conditions of a radio signal in the OFDM system. Japanese Patent Application Laid-Open No. 2006-295465 discloses a technique that determines to which of the communication systems a detected radio signal conforms by comparing output values from two cross-correlators detecting radio signals in the OFDM system and DSSS system.

SUMMARY OF THE INVENTION

However, in a receiving apparatus in related art for double wait, the probability of non-detection of a signal may increase because a correlation threshold value for signal detection is set high to reduce the probability of occurrence of erroneous detection. Moreover, in a technique to adjust the detection process by learning like the technique according to Japanese Unexamined Patent Application Publication No. 2007-523573, a high-level of detection precision can be hardly achieved before the learning process is sufficiently performed.

Thus, it is desirable to provide a novel and improved receiving apparatus and a receiving method that reduces the probability of erroneous detection due to double wait while suppressing an increase in the probability of non-detection of a signal.

According to an embodiment of the present invention, there is provided a receiving apparatus including a radio receiving section that receives a first radio signal transmitted according to a first communication system and a second radio signal transmitted according to a second communication system, a first detection section that detects the first radio signal among radio signals received by the radio receiving section, a second detection section that detects the second radio signal among radio signals received by the radio receiving section using a predetermined correlation threshold, and a threshold control section that temporarily changes the correlation threshold of the second detection section when the first radio signal is detected by the first detection section.

By the above configuration, the radio receiving section receives a first radio signal transmitted according to a first communication system or a second radio signal transmitted according to a second communication system. Then, among radio signals received by the radio receiving section, the first detection section detects the first radio signal, and the second detection section detects the second radio signal using a predetermined correlation threshold. If, at this point, the first radio signal is detected by the first detection section, the threshold control section temporarily changes the correlation threshold used by the second detection section.

The first detection section may perform primary detection to detect a portion of a preamble signal of the first radio signal and secondary detection to detect the whole preamble signal of the first radio signal.

Further, the threshold control section may temporarily change the correlation threshold of the second detection section when the primary detection of the first radio signal by the first detection section occurred.

The second detection section may perform primary detection to detect a portion of a preamble signal of the second radio signal and secondary detection to detect the whole preamble signal of the second radio signal.

Further, if the first radio signal is detected by the first detection section, the threshold control section may change the correlation threshold of the second detection section temporarily during a period including time points when an erroneous primary detection of the first radio signal by the second detection section is likely to occur.

The first detection section may perform primary detection to detect a portion of a preamble signal of the first radio signal and secondary detection to detect the whole preamble signal of the first radio signal, and the second detection section may perform primary detection to detect a portion of the preamble signal of the second radio signal and secondary detection to detect the whole preamble signal of the second radio signal.

Further, when primary detection of the first radio signal by the first detection section occurred, the threshold control section may change the correlation threshold of the second detection section temporarily during a period including time points when an erroneous primary detection of the first radio signal by the second detection section is likely to occur.

The receiving apparatus may further include a data processing section that performs processing for the decoded first radio signal if secondary detection of the first radio signal by the first detection section occurs prior to secondary detection of the second radio signal by the second detection section, and performs processing for the decoded second radio signal if secondary detection of the second radio signal by the second detection section occurs prior to secondary detection of the first radio signal by the first detection section.

The first communication system may be a direct sequence spread spectrum (DSSS) system.

The second communication system may be an orthogonal frequency division multiplexing (OFDM) system.

According to another embodiment of the present invention, there is provided a receiving apparatus including a radio receiving section that receives a first radio signal transmitted according to a first communication system and a second radio signal transmitted according to a second communication system, a first detection section that detects the first radio signal among radio signals received by the radio receiving section, a second detection section that detects the second radio signal among radio signals received by the radio receiving section using a predetermined correlation threshold, and a threshold setting section that sets the correlation threshold of the second detection section to a first value when only the second radio signal is awaited and sets the correlation threshold of the second detection section to a second value larger than the first value when the first radio signal and the second radio signal are awaited.

According to another embodiment of the present invention, there is provided a receiving method including the steps of: receiving a first radio signal transmitted according to a first communication system or a second radio signal transmitted according to a second communication system; detecting the first radio signal of the received first radio signal or the received second radio signal; changing temporarily a correlation threshold for detecting the second radio signal when the first radio signal is detected; and detecting the second radio signal of the received first radio signal or the received second radio signal using the temporarily changed correlation threshold.

According to a receiving apparatus and a receiving method in the present invention, as described above, the probability of erroneous detection due to double wait can be reduced while suppressing an increase in the probability of non-detection of a signal.

DETAILED DESCRIPTION OF THE PREFERRED EMBODIMENTS

Figure 1:
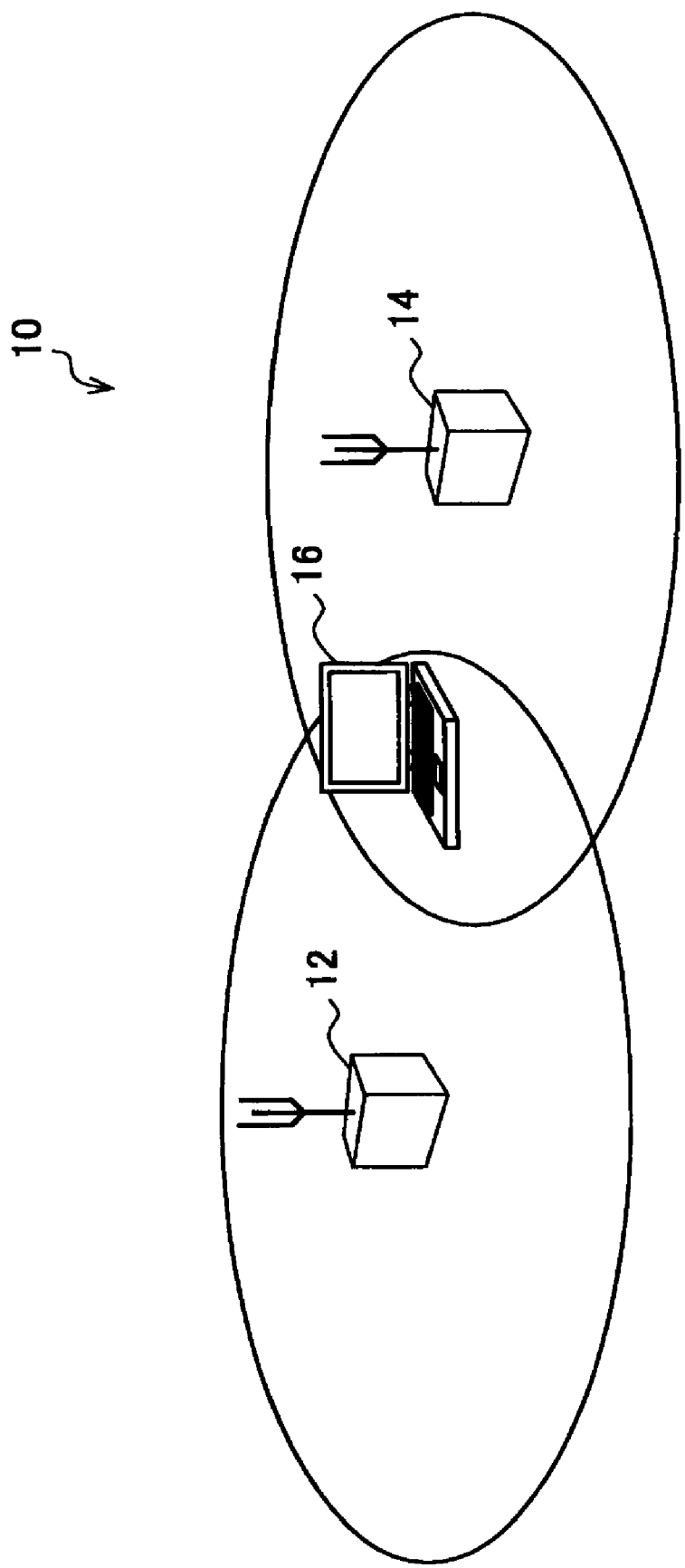
FIG. 1 is a schematic diagram showing a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and duplicate explanation of these structural elements is omitted.

First of all, FIG. 1 is an explanatory view showing the configuration of a radio communication system 10 according to an embodiment of the present invention. The radio communication system 10 shown in FIG. 1 includes a first transmitting apparatus 12, a second transmitting apparatus 14, and a receiving apparatus 16.

The first transmitting apparatus 12 transmits a radio signal according to a communication system such as the DSSS system or OFDM system to the receiving apparatus 16 to perform radio communication with the receiving apparatus 16. Similarly, the second transmitting apparatus 14 transmits a radio signal according to a communication system such as the OFDM system or DSSS system to the receiving apparatus 16 to perform radio communication with the receiving apparatus 16. Herein, the communication system used by the first transmitting apparatus 12 for transmission of a radio signal is called a first communication system, and that by the second transmitting apparatus 14 for transmission of a radio signal is called a second communication system.

Radio access points are shown in FIG. 1 as the first transmitting apparatus 12 and the second transmitting apparatus 14, but the first transmitting apparatus 12 and the second transmitting apparatus 14 are not limited to radio access points. For example, the first transmitting apparatus 12 and the second transmitting apparatus 14 may be network devices with a radio communication function, information processing devices such as PCs (Personal Computers) or workstations, or communication devices such as mobile phone terminals.

The receiving apparatus 16 is a receiving apparatus having a so-called double wait functionality which is capable of receiving both a first radio signal transmitted according to the first communication system from the first transmitting apparatus 12 and a second radio signal transmitted according to the second communication system from the second transmitting apparatus 14.

In FIG. 1, a PC is shown as the receiving apparatus 16, but the receiving apparatus 16 is not limited to a PC. Similarly to the first transmitting apparatus 12 and the second transmitting apparatus 14, the receiving apparatus 16 may be, for example, a network device, information processing device, communication device, or a communication module used by being connected to an information processing device.

FIG. 1 shows that the receiving apparatus 16 is positioned in a place where a communication area of the first transmitting apparatus 12 and a communication area of the second transmitting apparatus 14, each of which is shown as an ellipse, overlap each other. That is, there is a possibility that a radio signal according to one of the first communication system and the second communication system may arrive at the receiving apparatus 16 at any time.

When a radio signal according to the first communication system and a radio signal according to the second communication system are doubly awaited, receiving chains for both systems may simply be provided. In that case, a reception result that is received normally in the end of the chains will be simply adopted. However, in such a case, the scale of circuits increases and thus, such a receiving apparatus has no practicality as a receiving apparatus. Moreover, even if radio signals of different communication systems are received, processing after demodulation and decoding in the MAC (Media Access Control) or higher layer is generally in common. Thus, a configuration in which one process block performs processing of the MAC and higher layer in common is used in the following embodiment.

Figure 2:
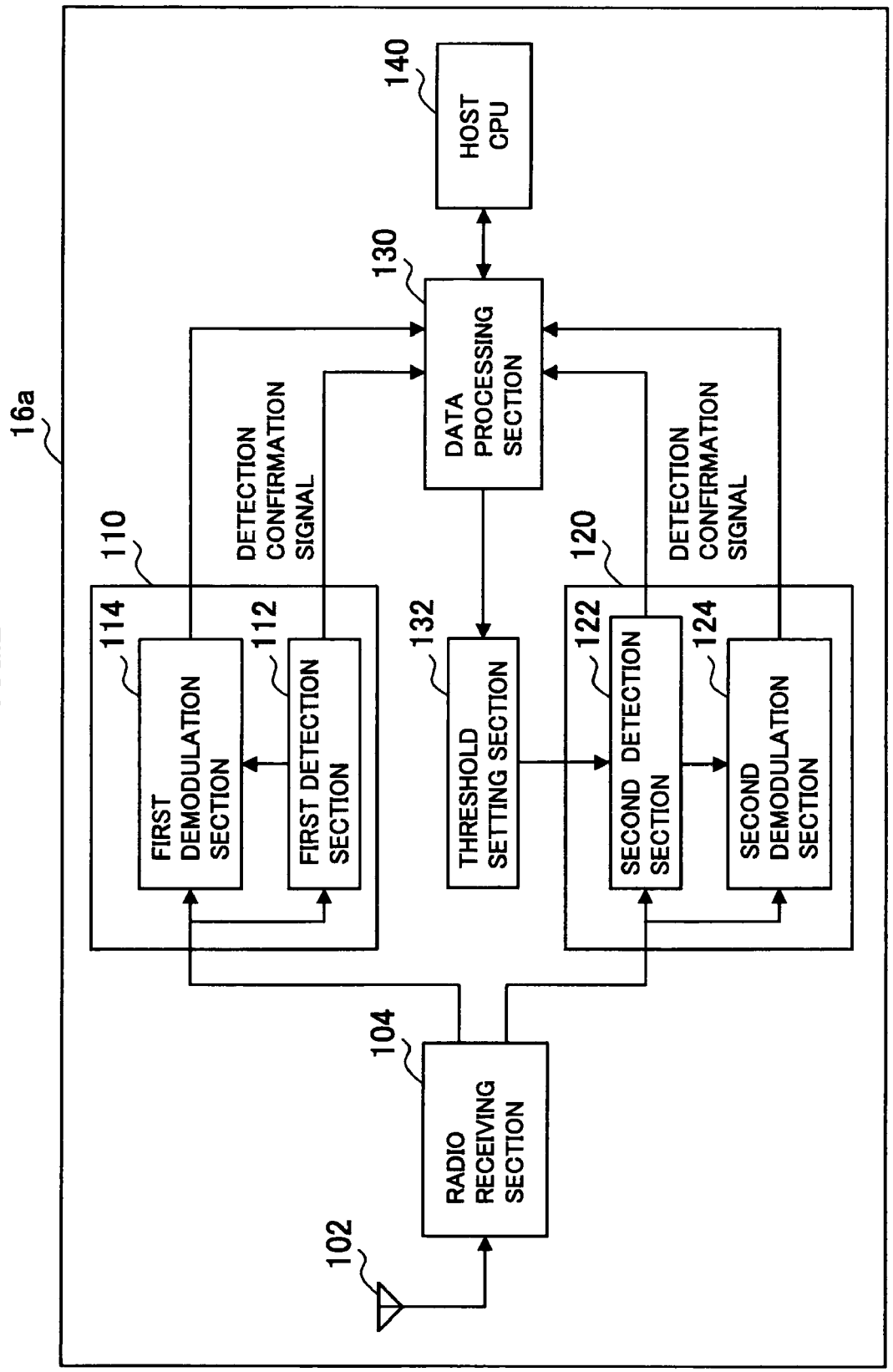
FIG. 2 is a block diagram showing a first configuration example of a receiving apparatus according to an embodiment.

FIG. 2 is a block diagram showing a first configuration example of the receiving apparatus 16 in which processing of the MAC and higher layer is commonly performed by one processing block. The receiving apparatus 16 according to the first configuration example will be referred as a receiving apparatus 16a below.

FIG. 2 shows that the receiving apparatus 16a includes a radio antenna 102, a radio receiving section 104, a first communication system processing section 110, a second communication system processing section 120, a data processing section 130, a threshold setting section 132, and a host CPU 140. Further, the first communication system processing section 110 includes a first detection section 112 and a first demodulation section 114. The second communication system processing section 120 includes a second detection section 122 and a second demodulation section 124.

The radio antenna 102 is connected to the radio receiving section 104 and is used for reception of a first radio signal transmitted according to the first communication system and a second radio signal transmitted according to the second communication system.

The radio receiving section 104 is connected to the first communication system processing section 110 and the second communication system processing section 120. The radio receiving section 104 amplifies a radio signal received by the radio antenna 102 and converts the frequency thereof and then, outputs the radio signal to the first communication system processing section 110 and the second communication system processing section 120.

In the first communication system processing section 110, a signal output from the radio receiving section 104 is input into the first detection section 112 and the first demodulation section 114. The first detection section 112 performs processing to detect first radio signals according to the first communication system among radio signals received by the radio receiving section 104.

When a radio signal according to the DSSS system should be detected, for example, the first detection section 112 calculates a cross correlation between a received signal and known preamble signal pattern using a correlator. Then, if the level of the calculated correlation signal exceeds a predetermined correlation threshold, a signal of the DSSS system is determined to be detected.

When a radio signal according to the OFDM system should be detected, for example, the first detection section 112 calculates an autocorrelation of a preamble signal contained in the received signal using a correlator. Then, if a predetermined repeated pattern of the preamble signal contained in the radio signal according to the OFDM system is detected based on the autocorrelation and the level of the correlation signal exceeds a predetermined correlation threshold, a signal of the OFDM system is determined to be detected.

Here, regardless of whether the DSSS system or the OFDM system is used as the communication system, a signal is generally detected in two steps. Signal detection in the first step is a signal detection using a correlation up to a portion of the preamble signal and this is herein called primary detection. Signal detection in the second step is conclusive signal detection using the whole preamble signal and this is herein called secondary detection.

If, for example, the DSSS system is used as the first communication system, the first detection section 112 first attempts the primary detection that detects a portion of the preamble signal of a radio signal according to the DSSS system. If the primary detection is successful, the first detection section attempts the secondary detection on a subsequently received preamble signal. If the secondary detection is successful, the first detection section 112 outputs a detection confirmation signal to the data processing section 130 and instructs the first demodulation section 114 to demodulate the received signal.

After receiving a demodulation instruction from the first detection section 112, the first demodulation section 114 demodulates and decodes a signal input from the radio receiving section 104 and outputs the decoded data signal to the data processing section 130. Depending on the communication system, the first demodulation section 114 may further perform processing such as Fast Fourier Transform (FFT) processing, deinterleave processing and so on.

In the second communication system processing section 120, on the other hand, a signal output from the radio receiving section 104 is input into the second detection section 122 and the second demodulation section 124. The second detection section 122 performs processing to detect second radio signals according to the second communication system among radio signals received by the radio receiving section 104. Similarly to detection of the first radio signal by the first detection section 112, a second radio signal is detected by the second detection section 122 in two steps of the primary detection and secondary detection by a technique using a correlation with a known preamble signal or an autocorrelation.

If, for example, the OFDM system is used as the second communication system, the second detection section 122 first attempts the primary detection that detects a portion of the preamble signal of a radio signal according to the OFDM system. If the primary detection is successful, the second detection section 122 attempts the secondary detection on a subsequently received preamble signal. If the secondary detection is successful, the second detection section 122 outputs a detection confirmation signal to the data processing section 130 and instructs the second demodulation section 124 to demodulate the received signal.

Here, correlation thresholds used for the primary detection and secondary detection by the second detection section 122 are set or changed by the threshold setting section 132. Settings of the correlation thresholds by the threshold setting section 132 will be described later, in detail.

After receiving a demodulation instruction from the second detection section 122, the second demodulation section 124 demodulates and decodes a signal input from the radio receiving section 104 and outputs the decoded data signal to the data processing section 130. Depending on the communication system, the second demodulation section 124 may further perform processing such as fast Fourier transform processing, deinterleave processing and so on.

After performing processing in the MAC layer for decoded data signals output from the first communication system processing section 110 and the second communication system processing section 120, the data processing section 130 outputs the acquired data to the CPU 140. More specifically, if, for example, a detection confirmation signal indicating that secondary detection has been successful is received from the first detection section 112, the data processing section 130 performs processing for the decoded data signal output from the first demodulation section 114. If, for example, a detection confirmation signal indicating that secondary detection has been occurred is received from the second detection section 122, the data processing section 130 performs processing for the decoded data signal output from the second demodulation section 124.

Which of the output signal from the first communication system processing section 110 and the output signal from the second communication system processing section 120 is processed in the data processing section 130 depends on from which processing section a detection confirmation signal is first output. That is, if a detection confirmation signal is first output from the first communication system processing section 110 or the second communication system processing section 120, the data processing section 130 processes the data signal of the either side that has output the detection confirmation signal. Then, even if detection confirmation information is output from the other side, the data processing section 130 ignores the detection confirmation information output later.

When a determination based on such detection confirmation information is made, the receiving apparatus 16a may not be able to receive a first radio signal and a second radio signal simultaneously. However, if two signals arrive at the receiving apparatus 16a simultaneously, it is assumed that interference occurred. Therefore, it is inevitable that two radio signals are not received normally under such circumstances. In contrast, if the first detection section 112 or the second detection section 122 erroneously detects a signal that should not be detected and outputs detection confirmation information, it is possibly caused that the data processing section 130 selects wrong signal for processing.

Erroneous detection of a signal that can be considered is roughly classified into a case when a signal transmitted by a different communication system is erroneously recognized as a signal of the other communication system and a case when noise and the like present in communication environments is erroneously recognized as a packet. Among these cases of erroneous detection, when a signal is transmitted by a different communication system, the level of signal is higher than that used for usual communication, that is, the level of noise and the like. Thus, the probability of erroneously recognizing a signal transmitted by a different communication system as a signal of the other communication system may be greater than the probability of recognizing noise and the like present in communication environments as a packet. Thus, the receiving apparatus 16a according to the first configuration example reduces the probability of erroneous detection of a signal when the communication system is erroneously detected using the configuration described below.

Figure 3:
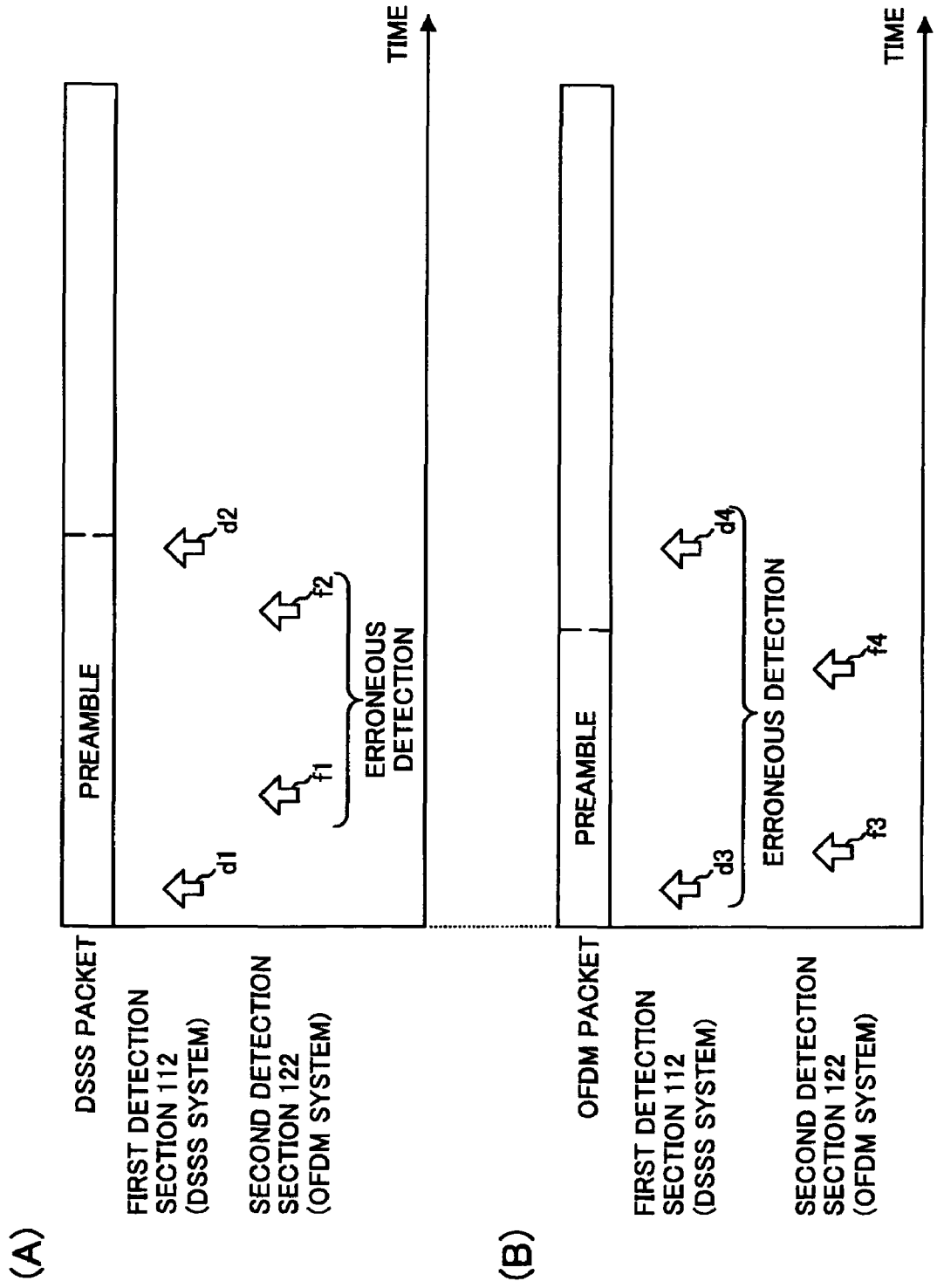
FIG. 3 is an explanatory view exemplifying timings of primary detection and secondary detection of packets.

FIG. 3 is an explanatory view schematically showing timings of primary detection and secondary detection of a radio signal in the first detection section 112 and the second detection section 122. Here, it is assumed, as an example, that the first detection section 112 detects packets according to the DSSS system as the first radio signal and the second detection section 122 detects packets according to the OFDM system as the second radio signal.

FIG. 3(A) shows timings of primary detection and secondary detection by the first detection section 112 and the second detection section 122 when packets according to the DSSS system are received by the receiving apparatus 16a using arrows d1 and d2, and f1 and f2, respectively.

With reference to FIG. 3(A), primary detection of packets according to the DSSS system by the first detection section 112 first occurs (the arrow d1). Next, there is a possibility that primary detection of packets according to the DSSS system by the second detection section 122 may occur (the arrow f1). Since the second detection section 122 is originally intended for detecting packets according to the OFDM system, the arrow f1 indicates erroneous detection of packets. Further, there is a possibility that secondary detection of packets according to the DSSS system by the second detection section 122 may occur (the arrow f2). The arrow f2 also indicates erroneous detection of packets. After that, secondary detection of packets according to the DSSS system by the first detection section 112 occurs (the arrow d2).

Here, the order of primary detection and secondary detection of packets between communication systems depends on the format of a preamble signal provided by specifications of each communication system. For example, a preamble signal according to the DSSS system based on IEEE802.11b shown in FIG. 3(A) is longer than that according to the OFDM system based on IEEE802.11a/n shown in FIG. 3(B). Thus, the time from the start of packet reception to secondary detection of packets by the first detection section 112 (the arrow d2) is longer than the time to secondary detection of packets by the second detection section 122 (the arrow f2). In contrast, experiments have shown that the time to primary detection of packets detected by the first detection section 112 (the arrow d1) is shorter than the time to primary detection of packets detected by the second detection section 122 (the arrow f1).

FIG. 3(B) shows timings of primary detection and secondary detection by the first detection section 112 and the second detection section 122 when packets according to the OFDM system are received by the receiving apparatus 16a using arrows d3 and d4, and f3 and f4, respectively.

With reference to FIG. 3(B), there is a possibility that primary detection of packets according to the OFDM system by the first detection section 112 may occur first (the arrow d3). Next, primary detection of packets according to the OFDM system by the second detection section 122 occurs (the arrow f3). Further, secondary detection of packets according to the OFDM system by the second detection section 122 occurs (the arrow f4). After that, there is a possibility that secondary detection of packets according to the OFDM system by the first detection section 112 may occur (the arrow d4). The arrows d3 and d4 indicate erroneous detection of packets.

Among such erroneous detection of packets, the secondary detection (the arrow d4) of packets according to the OFDM system by the first detection section 112 shown in FIG. 3(B) occurs at a later time point than the normal secondary detection (the arrow f4) by the second detection section 122. Thus, erroneous detection (the arrows d3 and d4) shown in FIG. 3(B) are in the end ignored by the data processing section 130 and does not affect operations of the receiving apparatus 16a. On the other hand, erroneous detection (the arrow f2) of packets according to the DSSS system by the second detection section 122 shown in FIG. 3(A) occurs at an earlier time point than the normal secondary detection (the arrow d2) by the first detection section 112. Thus, if erroneous detection (the arrows f1 and f2) shown in FIG. 3(A) occurs, detection confirmation information based on the erroneous detection is output, resulting in normal secondary detection by the first detection section 112 in the data processing section 130 being ignored and thus, there is a possibility that data to be processed may not be processed.

In order to avoid such a possibility, when packets according to both the DSSS system and the OFDM system are awaited, the receiving apparatus 16a according to the first configuration example sets the correlation threshold for detecting packets according to the OFDM system by the second detection section 122 higher than when double wait is not performed.

Figure 4:
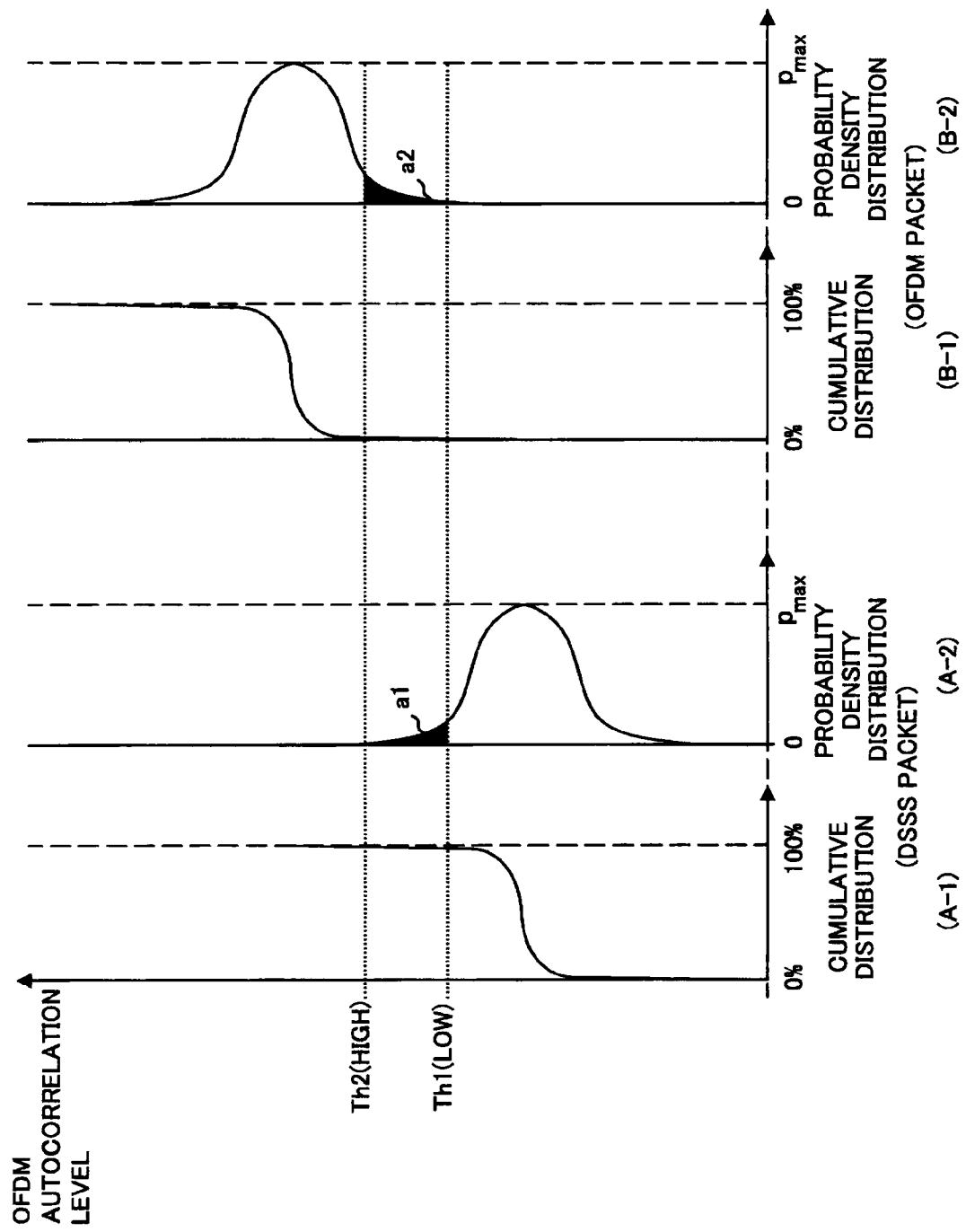
FIG. 4 is an explanatory view showing distributions of autocorrelation levels of DSSS packets and OFDM packets as OFDM packets.

Four graphs shown in FIG. 4 show correlation levels of autocorrelations of packets according to the DSSS system and the OFDM system as packets according to the OFDM system by the second detection section 122.

FIG. 4(A-1) shows a cumulative distribution of correlation level when an autocorrelation of packets according to the DSSS system is calculated as those according to the OFDM system.

FIG. 4(A-2) shows a probability density distribution for the cumulative distribution of FIG. 4(A-1).

FIG. 4(A-2) shows that most packets according to the DSSS system exhibit a correlation level lower than a threshold Th1. However, packets corresponding to an area a1 exhibit a correlation level higher than the threshold Th1 and lower than a threshold Th2.

FIG. 4(B-1) shows a cumulative distribution of correlation level when an autocorrelation of packets according to the OFDM system is calculated as those according to the OFDM system.

FIG. 4(B-2) shows a probability density distribution for the cumulative distribution of FIG. 4(B-1).

FIG. 4(B-2) shows that most packets according to the OFDM system exhibit a correlation level higher than the threshold Th2. However, packets corresponding to an area a2 exhibit a correlation level higher than the threshold Th1 and lower than the threshold Th2.

When, for example, only packets according to the OFDM system are awaited in relations of correlation level shown in FIG. 4, almost all packets according to the OFDM system can be detected by setting the correlation threshold to the threshold Th1. On the other hand, when radio signals according to both the DSSS system and the OFDM system are awaited, if the correlation threshold is set to the threshold Th1, packets according to the DSSS system for the area a1 in FIG. 4(A-2) may be detected as packets according to the OFDM system. Thus, as described above, when radio signals according to both the DSSS system and the OFDM system are awaited, the probability of erroneous detection of packets can be reduced by switching the correlation threshold for detecting packets according to the OFDM system from the threshold Th1 to the threshold Th2 by the second detection section 122.

Switching of the correlation threshold used for the second detection section 122 can be realized, for example, by the threshold setting section 132 being instructed by the data processing section 130 to rewrite the correlation threshold in accordance with a receive mode. The receive mode refers to a waiting state such as awaiting packets according to both the first communication system and the second communication system, or awaiting packets according to only one of these communication systems. For example, the receive mode specified by a user may be conveyed to the threshold setting section 132 via the data processing section 130 to cause the threshold setting section 132 to rewrite the correlation threshold. Or, for example, the data processing section 130 may decide the receive mode based on content of a signal received from the transmitting apparatus 12 or the transmitting apparatus 14 to cause the threshold setting section 132 to rewrite the correlation threshold.

Up to here, the receiving apparatus 16a according to the first configuration example has been described using FIG. 2 to FIG. 4. According to the receiving apparatus 16a, the correlation threshold for detecting a radio signal in the second detecting section 122 is rewritten depending on whether or not packets according to both the first communication system and the second communication system are awaited. According to the above configuration, the probability of erroneous detection among radio signals when radio signals according to both systems are awaited can be reduced without increasing the probability of non-detection of signals when only signals according to one of the communication systems are awaited.

Concrete settings of the thresholds Th1 and Th2 shown in FIG. 4 are adjusted based on an experiment or data simulation when necessary. The switch of the threshold in accordance with the receive mode may be carried out either for primary detection or secondary detection of a second radio signal by the second detection section 122. However, findings obtained from data simulations teach that switch of the threshold in accordance with the receive mode can effectively be performed when the correlation threshold is switched for primary detection of a second radio signal by the second detection section 122.

Next, a second configuration example of the receiving apparatus 16 will be described using FIG. 5 to FIG. 9.

If, in the receiving apparatus 16a according to the first configuration example, packets according to both the first communication system and the second communication system are awaited, the correlation threshold is set, for example, to the threshold Th2 shown in FIG. 4. Thus, there is a possibility that, for example, signals contained in the area a2 in FIG. 4(B-2) that should be detected may not be detected. Thus, in a receiving apparatus 16b according to the second configuration example described below, the probability of non-detection of signals to be detected is further reduced by dynamically controlling the correlation threshold used by the second detection section 122.

Figure 5:
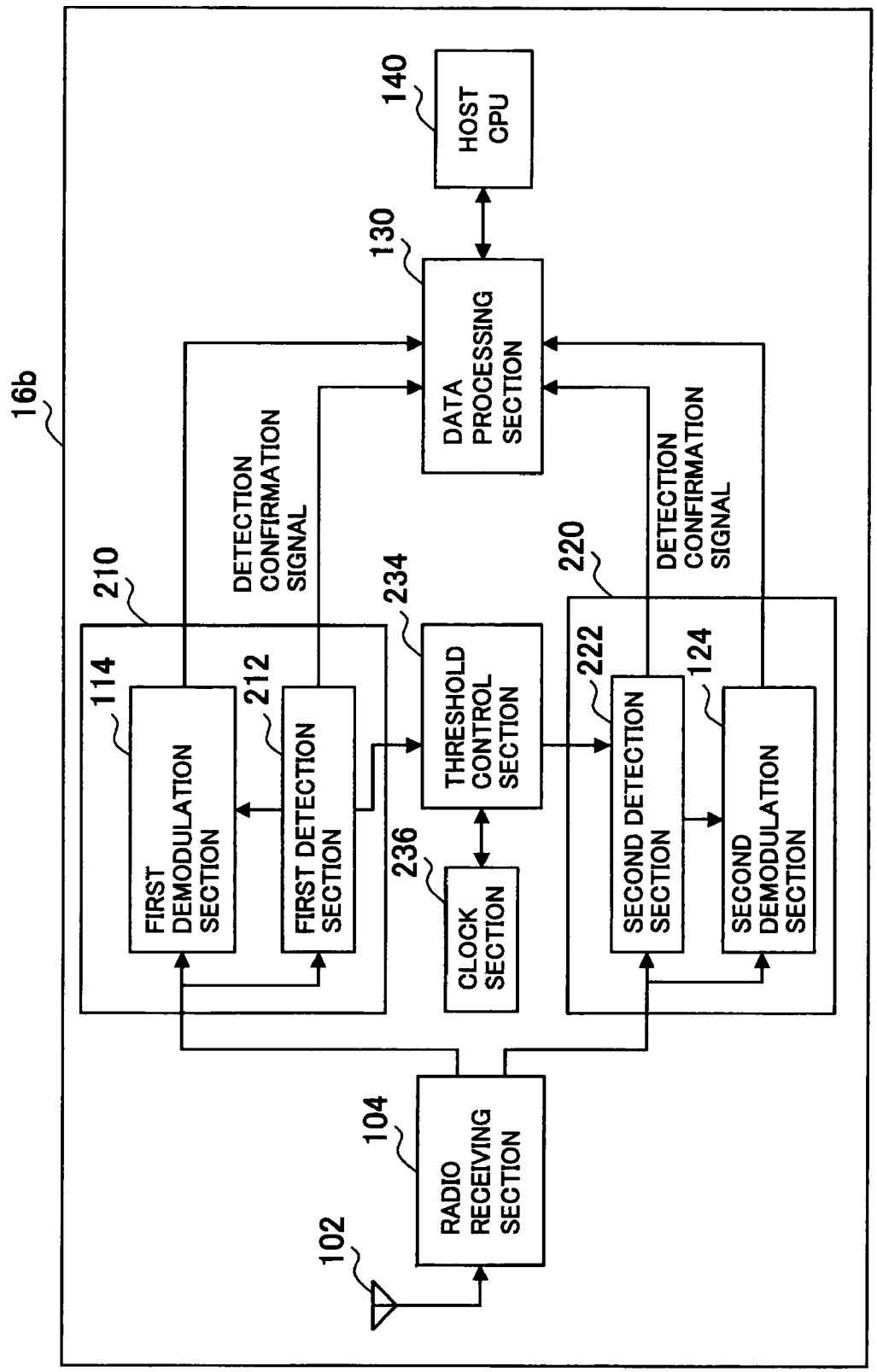
FIG. 5 is a block diagram showing a second configuration example of the receiving apparatus according to an embodiment.

FIG. 5 is a block diagram showing the configuration of the receiving apparatus 16b according to the second configuration example.

FIG. 5 shows that the receiving apparatus 16b includes the radio antenna 102, the radio receiving section 104, a first communication system processing section 210, a second communication system processing section 220, the data processing section 130, a threshold control section 234, a clock section 236, and the host CPU 140. Further, the first communication system processing section 210 includes a first detection section 212 and the first demodulation section 114. The second communication system processing section 220 includes a second detection section 222 and the second demodulation section 124.

Similarly to the first detection section 112 of the receiving apparatus 16a, the first detection section 212 performs primary detection and secondary detection of first radio signals transmitted according to the first communication system. If primary detection of a first radio signal occurs, the first detection section 212 outputs a primary detection signal notifying the threshold control section 234 that primary detection of a first radio signal has occurred.

After receiving the primary detection signal from the first detection section 212, the threshold control section 234 measures the time by using the clock section 236 and when a predetermined time point described below comes, the correlation threshold used by the second detection section 222 is changed. The clock section 236 is typically implemented as a timer.

Figure 6:
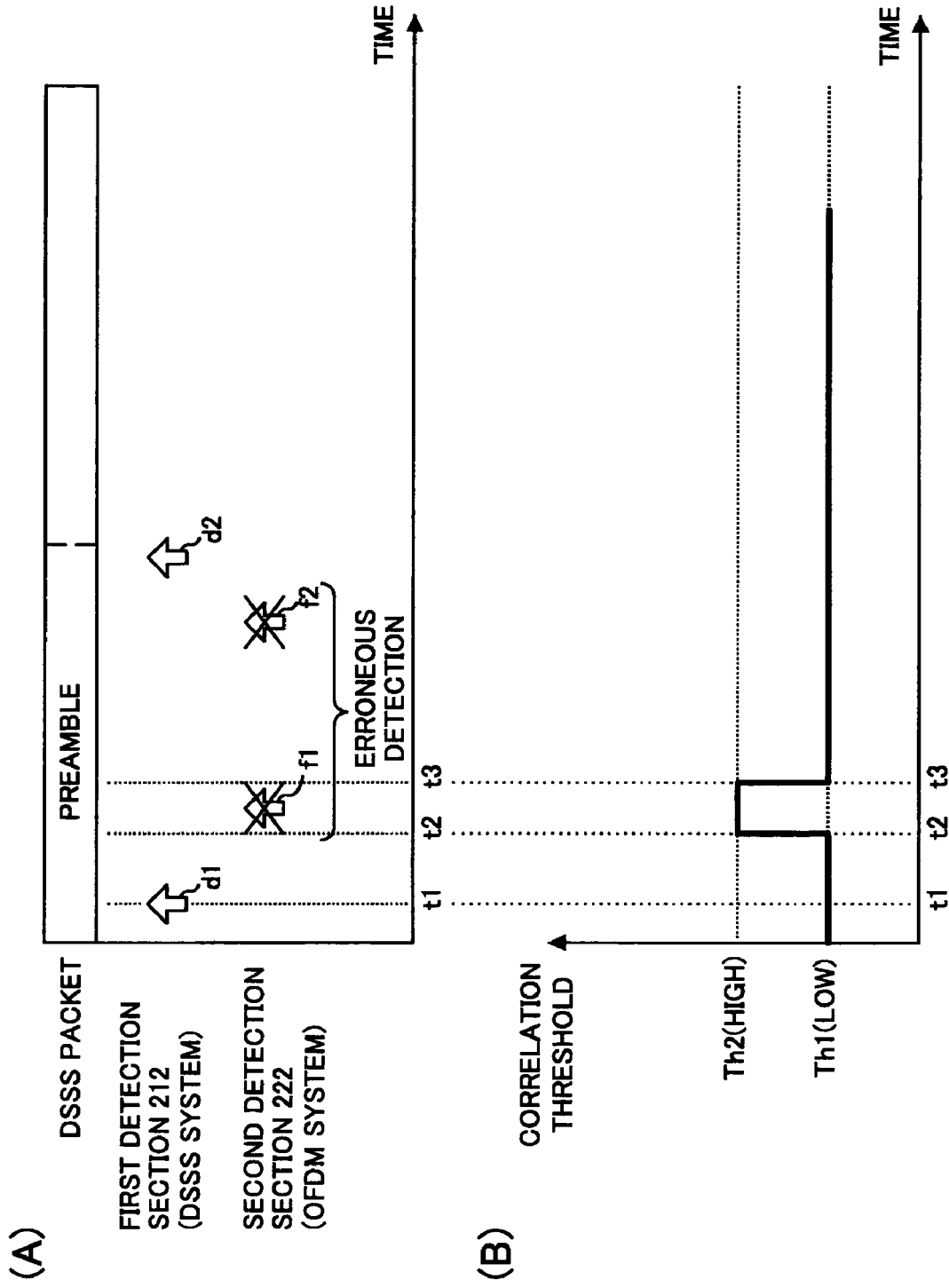
FIG. 6 is an explanatory view exemplifying a relation between a temporary change of correlation threshold and detection timing of DSSS packets.

FIG. 6 is an explanatory view illustrating how the correlation threshold used by the second detection section 222 is controlled by the threshold control section 234 together with detection timing of packets according to the DSSS system along the time axis. It is assumed in FIG. 6, like FIG. 3 and FIG. 4, that packets according to the DSSS system are detected by the first detection section 212 and those according to the OFDM system by the second detection section 222.

FIG. 6(A) shows timings of primary detection and secondary detection (the arrows d1, d2, f1, and f2) by the first detection section 212 and the second detection section 222 when packets according to the DSSS system are received by the receiving apparatus 16b. FIG. 6(A) also shows a time t1 of primary detection of a packet according to the DSSS system by the first detection section 212 and also times t2 and t3 subsequent to the time t1. FIG. 6(A) shows that a time point (the arrow f1) when erroneous primary detection of a packet according to the DSSS system by the second detection section 222 is likely to occur is located between time t2 and time t3. The threshold control section 234 temporarily changes the correlation threshold used by the second detection section 222 during the period between time t2 and time t3, for example, from the threshold Th1 to the threshold Th2.

FIG. 6(B) shows how the correlation threshold used by the second detection section 222 is controlled by the threshold control section 234 along the time axis. FIG. 6(B) shows that a primary detection signal for notification of primary detection of a first radio signal is first output from the first detection section 212 to the threshold control section 234 at time t1. At this point, the correlation threshold used by the second detection section 222 is set to the threshold Th1.

Then, the threshold control section 234 causes, for example, the clock section 236 to keep time from time t1 to time t2 and, when the time t2 comes, changes the correlation threshold used by the second detection section 222 to the threshold Th2. Subsequently, when the time t3 comes, the threshold control section 234 further changes the correlation threshold used by the second detection section 222 from the threshold Th2 to the threshold Th1.

By changing the correlation threshold used by the second detection section 222 in this manner, the probability of erroneous primary detection of a packet according to the DSSS system by the second detection section 222 is reduced. This is because, for example, the level of autocorrelation of packets according to the DSSS system as packets according to the OFDM system contained in the area a1 in FIG. 4(A-2) falls below the threshold Th2. If erroneous primary detection of a packet according to the DSSS system does not occur, secondary detection by the second detection section 222 will not be attempted. As a result, the probability that a detection confirmation signal is erroneously output from the second detection section 222 is also reduced.

Figure 7:
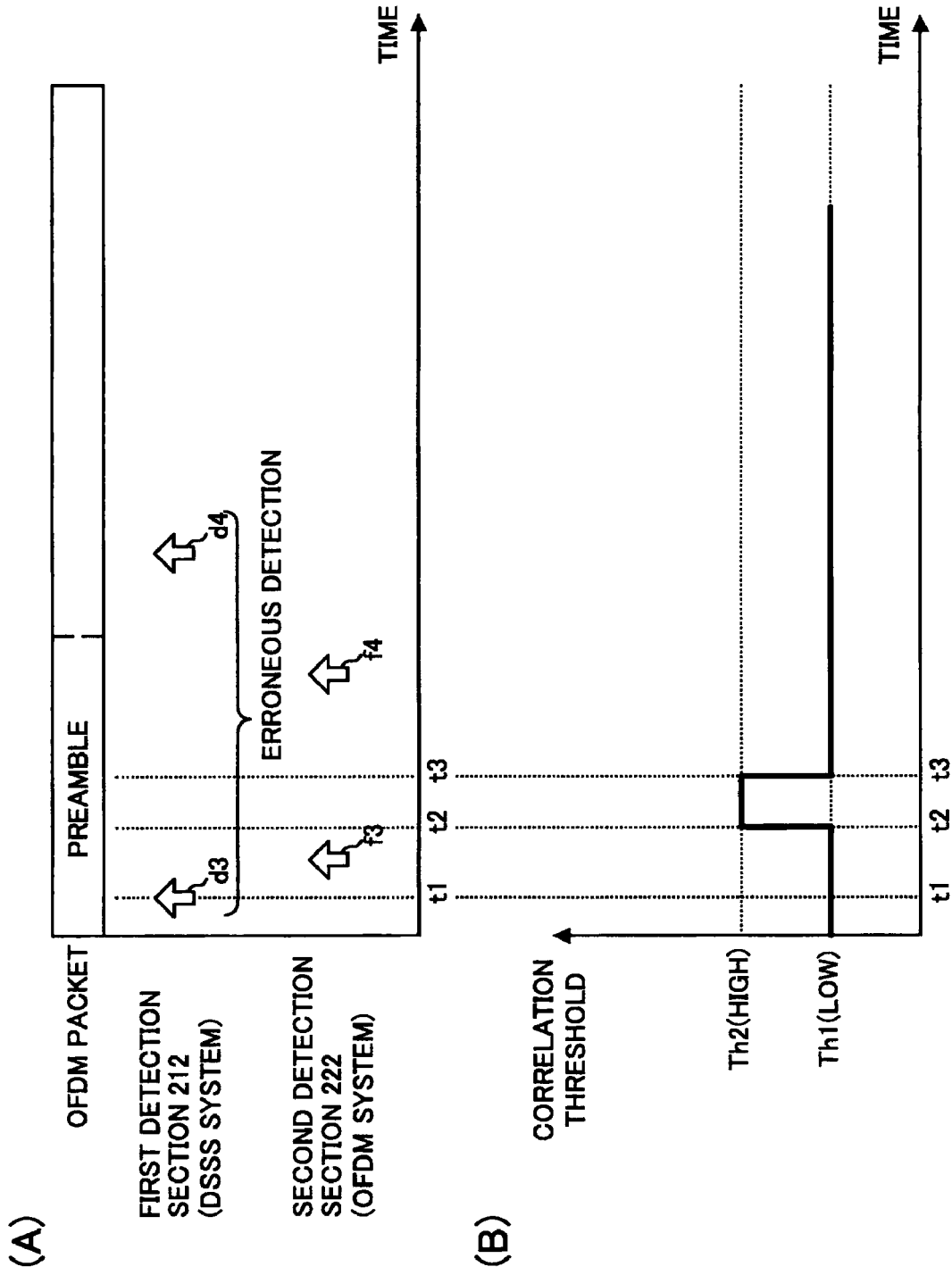
FIG. 7 is an explanatory view exemplifying the relation between a temporary change of correlation threshold and detection timing of OFDM packets.

Next, FIG. 7 is an explanatory view illustrating how the correlation threshold used by the second detection section 222 is controlled by the threshold control section 234 together with detection timing of packets according to the OFDM system along the time axis.

FIG. 7 is illustrated to show that a primary detection signal for notification of primary detection of a primary radio signal is first output from the first detection section 212 to the threshold control section 234 at time t1 (the arrow d3). In contrast to the arrow d1 in FIG. 6, the arrow d3 indicates that the first detection section 212, which should detect packets according to the DSSS system, has erroneously detected a packet according to the OFDM system. Since the DSSS system and the OFDM system are different in the format of a preamble signal of a packet, the time until the time t1 comes after starting packet reception is normally not the same in FIG. 6 and FIG. 7. However, both the time points of the arrow d1 in FIG. 6 and the arrow d3 in FIG. 7 are represented as the time t1 as a time of starting point of dynamic control of the correlation threshold by the threshold control section 234 for both FIG. 6 and FIG. 7.

Subsequently, similarly to FIG. 6, the threshold control section 234 causes, for example, the clock section 236 to keep time from time t1 to time t2 and, when the time t2 comes, changes the correlation threshold used by the second detection section 222 to the threshold Th2. Subsequently, when the time t3 comes, the threshold control section 234 further changes the correlation threshold used by the second detection section 222 from the threshold Th2 to the threshold Th1.

Here, as shown in FIG. 7(A), a time point (the arrow f3) when primary detection of a packet according to the OFDM system by the second detection section 222 occurs is not located between time t2 and time t3. This results from the fact that the DSSS system and the OFDM system are different in the format of a preamble signal of a packet. Thus, even if the first detection section 212 erroneously outputs a primary detection signal about a packet according to the OFDM system, the second detection section 222 can successfully detect a packet according to the OFDM system using the threshold Th1 for determination by the correlation level at the time point of the arrow f3. Accordingly, the probability of non-detection of a packet according to the OFDM system that should be detected by the second detection section 222 is maintained low.

In FIG. 6 and FIG. 7, the times t2 and t3 are shown as an example of timing when the correlation threshold is temporarily changed to a larger value by the threshold control section 234. However, the timing to temporarily change the correlation threshold should be appropriately set based on experiments or simulations so that a time point when an erroneous primary detection of a first radio signal by the second detection section 222 is likely to occur is located between the two time points.

Figure 8:
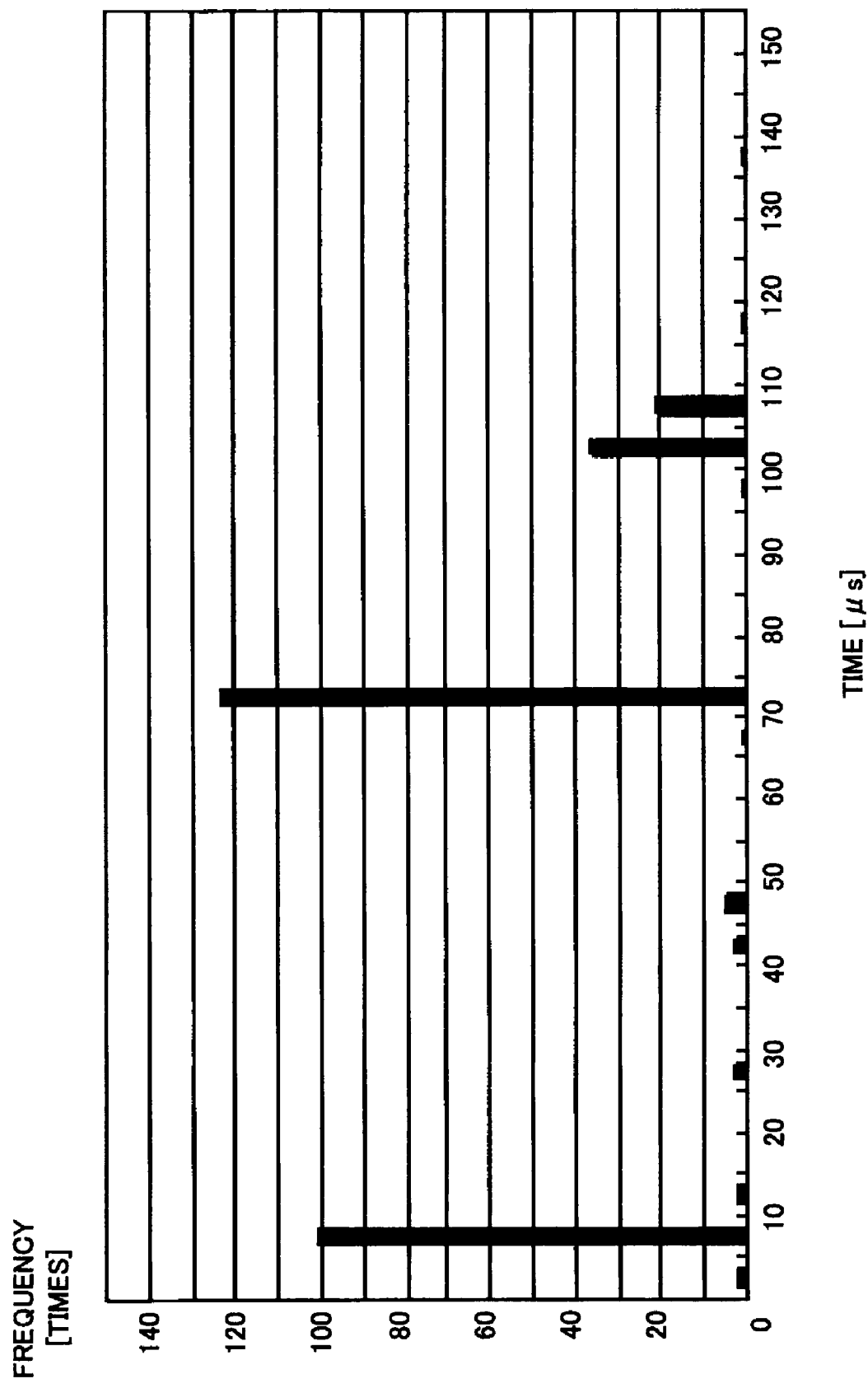
FIG. 8 is a graph showing a simulation result of detection timing of packets.

FIG. 8 shows a distribution of timing of erroneous primary detection by the second detection section 222 of packets according to the DSSS system as an example of simulation results in accordance with characteristics of the receiving apparatus 16b.

The horizontal axis of the graph in FIG. 8 is a time axis and the value of the horizontal axis represents the time [μs] after normal primary detection of a packet according to the DSSS system by the first detection section 212 till erroneous primary detection of the packet by the second detection section 222. The vertical axis represents a cumulative frequency [times] of erroneous primary detection of packets according to the DSSS system by the second detection section 222.

FIG. 8 shows that time points of erroneous primary detection by the second detection section 222 of packets according to the DSSS system are concentrated in three periods, that is, 0 to 10 μs, 70 to 80 μs, and 100 to 110 μs. Thus, the threshold control section 234 may temporarily increase the correlation threshold used by the second detection section 222, for example, between time t2 and time t3 set so as to include these three periods.

Figure 9:
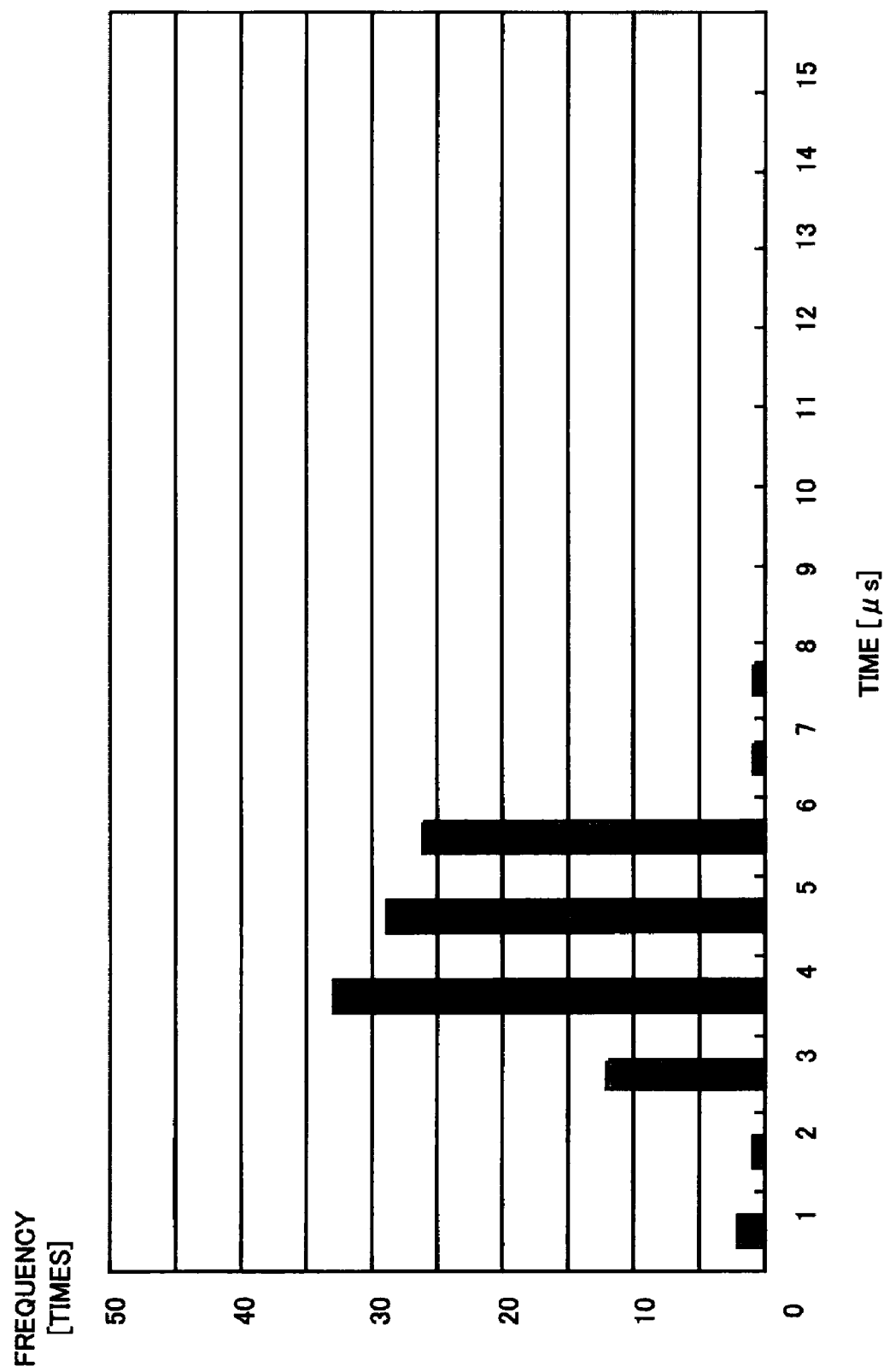
FIG. 9 is a partially enlarged graph of the simulation result of FIG. 8.

FIG. 9 is a graph showing an enlarged distribution in the range of 0 to 15 μs of the simulation results shown in FIG. 8. Referring to FIG. 9, most erroneous detection by the second detection section 222 of packets according to the DSSS system occurs after 2 μs passed since normal primary detection by the first detection section 212. Further, referring to FIG. 8, erroneous detection by the second detection section 222 of packets according to the DSSS system continues until a period of 144 μs passes after normal primary detection by the first detection section 212. Thus, for example, the time t2 may be set to a time when 2 μs passed since a normal primary detection by the first detection section 212 occurred, and the time t3 may be set to a time when 144 μs passed since a normal primary detection by the first detection section 212 occurred. Alternatively, instead of a time point when a preset time passes, the time t3 may be a time point when secondary detection of a packet according to the DSSS system by the first detection section 212 occurs.

When the receiving apparatus 16b received packets according to the DSSS system 10,000 times in simulations shown in FIG. 8 and FIG. 9, erroneous detection of packets by the second detection section 222 occurred 300 times. This means that the ratio of packets contained in the area a1 in the probability density distribution shown as an example in FIG. 4(A-2) is 3% per the total number of packets when the probability for the level of autocorrelation to exceed the threshold Th2 is minimized by setting threshold Th2 in FIG. 4 to be a higher value. On the other hand, if the correlation threshold of the second detection section 222 is temporarily increased after primary detection of a packet according to the DSSS system by the first detection section 212, for example, in a period of 2 μs to 144 μs, the rate of erroneous detection of packets by the second detection section 222 was reduced to 0.2%. This shows that the probability of erroneous detection of packets according to the DSSS system is reduced in the receiving apparatus 16b according to the second configuration example of the present embodiment.

Note that the period during which the correlation threshold is temporarily increased may not be one continuous period. For example, the correlation threshold may temporarily be switched like "low"→"high"→"low" in each of the three periods in which the cumulative frequency of erroneous detection in FIG. 8 sticks out. Alternatively, the correlation threshold may be controlled to be low in timing of normal primary detection by the second detection section 222 by measuring the time after erroneous primary detection of packets according to the OFDM system by the first detection section 212 till normal primary detection by the second detection section 222 in advance.

Up to here, the receiving apparatus 16b according to the second configuration example has been described using FIG. 5 to FIG. 9. According to the receiving apparatus 16b, when a first radio signal is primarily detected by the first detection section 212, the correlation threshold of the second detection section 222 is temporarily changed by the threshold control section 234. By such a configuration, in contrast to the receiving apparatus 16a described above, even when both first radio signals and second radio signals are awaited, second radio signals can be detected with a relatively low correlation threshold as long as primary detection of first radio signals does not occur.

The period during which the correlation threshold of the second detection section 222 is temporarily changed when primary detection of first radio signals by the first detection section 212 occurs is a limited period containing time points when an erroneous primary detection of first radio signals by the second detection section 222 is likely to occur. By such a configuration, the correlation threshold can be set to a relatively high value at time points when an erroneous primary detection of first radio signals by the second detection section 222 is likely to occur and the correlation threshold can be set to a low value during the other period. Accordingly, the probability of erroneous detection of first radio signals can be reduced while suppressing an increase in the probability of non-detection of second radio signals by the second detection section 222.

In addition, in FIG. 5, the threshold control section 234 and the clock section 236 are configured separately from the first communication system processing section 210 and the second communication system processing section 220. However, the threshold control section 234 or the clock section 236 may be included in the first communication system processing section 210 or the second communication system processing section 220.

There is still a possibility of erroneous primary detection of noise and the like present in communication environments as a first radio signal (such as a packet according to the DSSS system) even by the receiving apparatus 16b. In order to exclude in such a case possibilities that a second radio signal (such as a packet according to the OFDM system) that may subsequently be received should remain undetected as much as possible, it is effective to set the time in which the correlation threshold is temporarily increased at a short time. However, the probability that noise or the like is erroneously detected as a first radio signal and a second radio signal is received in timing in which the correlation threshold is temporarily changed is not so great as to affect actual operation. Thus, the probability of non-detection of a signal resulting from noise or the like may not be considered for implementation of the receiving apparatus 16b.

It does not matter whether a sequence of processing according to the present embodiment is realized by hardware or software. When software is used to realize a sequence of processing, a program implementing the software is executed by using a computer embedded in dedicated hardware or, for example, a general-purpose computer shown in FIG. 10.

Figure 10:
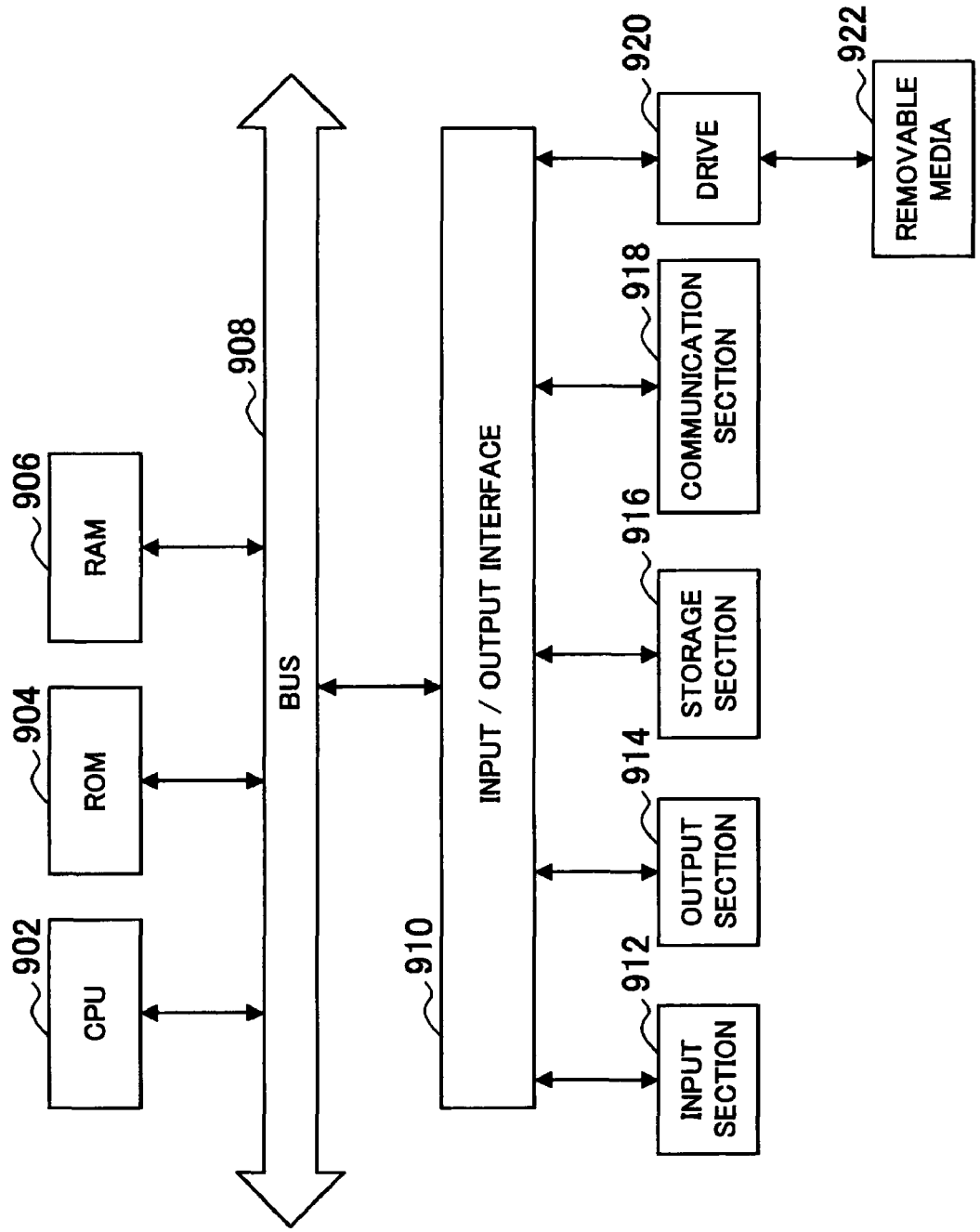
FIG. 10 is a block diagram showing a configuration example of a general-purpose computer.

In FIG. 10, a CPU (Central Processing Unit) 902 controls overall operations of a general-purpose computer. The CPU 902 in FIG. 10 may be the same CPU as the host CPU 140 shown in FIG. 2 and FIG. 5. A program describing a portion or all of a sequence of processing or data is stored in a ROM (Read Only Memory) 904. A program or data used by the CPU 902 for processing is temporarily stored in a RAM (Random Access Memory) 906.

The CPU 902, the ROM 904, and the RAM 906 are mutually connected via a bus 908. An input/output interface 910 is further connected to the bus 908.

The input/output interface 910 is an interface to connect the CPU 902, the ROM 904, and the RAM 906 to an input section 912, an output section 914, a storage section 916, a communication section 918, and a drive 920.

The input section 912 accepts instructions from a user or information input via an input device such as a button, switch, lever, mouse, or a keyboard. For example, the receiving device 16 may allow the user to specify the receive mode via the input section 912. The output section 914 outputs information to the user via a display device such as a CRT (Cathode Ray Tube), liquid crystal display, and OLED (Organic Light Emitting Device) or a sound output device such as a speaker.

The storage section 916 is constituted, for example, by a hard disk drive or flash memory and stores programs, program data and the like. The communication section 918 performs communication processing via a network such as a LAN (Local Area Network) or the Internet. The drive 920 is provided in a general-purpose computer when necessary and, for example, a removable media 922 is inserted into the drive 920.

When a sequence of processing according to the present embodiment is performed by software, for example, a program stored in the ROM 904, the storage section 916, or the removable media 922 is read into the RAM 906 for execution and executed by the CPU 902.

It should be understood by those skilled in the art that various modifications, combinations, sub-combinations and alterations may occur depending on design requirements and other factors insofar as they are within the scope of the appended claims or the equivalents thereof.

For example, an example in which the first transmitting apparatus 12 transmits a radio signal according to the first communication system and the second transmitting apparatus 14 transmits a radio signal according to the second communication system to the receiving apparatus 16 is described herein. However, for example, the radio communication system 10 may be configured so that radio signals according to two or more communication systems are transmitted from one or three or more transmitting apparatuses to the receiving apparatus 16.

The present application contains subject matter related to that disclosed in Japanese Priority Patent Application JP 2008-135970 filed in the Japan Patent Office on May 23, 2008, the entire content of which is hereby incorporated by reference.

What is claimed is:

1. A receiving apparatus, comprising:
a radio receiving section that receives a first radio signal transmitted according to a first communication system and a second radio signal transmitted according to a second communication system;
a first detection section that detects the first radio signal among radio signals received by the radio receiving section according to the first communication system;
a second detection section that detects the second radio signal among radio signals received by the radio receiving section according to the second communication system using a predetermined correlation threshold;
a threshold control section that temporarily changes the predetermined correlation threshold of the second detection section when a segment of the first radio signal is detected by the first detection section, wherein the predetermined correlation threshold represents a cross correlation between the second radio signal and a portion of a preamble signal of the second radio signal; and
a data processing section that processes, based on a temporal order of the first and second radio signals being detected according to the respective first or second communication system, one of a first decoded signal corresponding to the first radio signal or a second decoded signal corresponding to the second radio signal,
wherein the first detection section performs primary detection to detect a portion of a preamble signal of the first radio signal and secondary detection to detect the whole preamble signal of the first radio signal and the second detection section performs primary detection to detect the portion of the preamble signal of the second radio signal and secondary detection to detect the whole preamble signal of the second radio signal, and
wherein the data processing section performs processing for the first decoded signal if secondary detection of the first radio signal by the first detection section occurs prior to secondary detection of the second radio signal by the second detection section, and performs processing for the second decoded signal if secondary detection of the second radio signal by the second detection section occurs prior to secondary detection of the first radio signal by the first detection section.

2. The receiving apparatus according to claim 1, wherein the threshold control section temporarily changes the predetermined correlation threshold of the second detection section when the primary detection of the first radio signal by the first detection section occurred.

3. The receiving apparatus according to claim 1, wherein if the segment is detected by the first detection section, the threshold control section changes the predetermined correlation threshold of the second detection section temporarily during a period including time points when an erroneous primary detection of the first radio signal by the second detection section is likely to occur.

4. The receiving apparatus according to claim 1, wherein when primary detection of the first radio signal by the first detection section occurred, the threshold control section changes the predetermined correlation threshold of the second detection section temporarily during a period including time points when an erroneous primary detection of the first radio signal by the second detection section is likely to occur.

5. The receiving apparatus according to claim 1, wherein the first communication system is a direct sequence spread spectrum system.

6. The receiving apparatus according to claim 1, wherein the second communication system is an orthogonal frequency division multiplexing system.

7. A receiving apparatus, comprising:
a radio receiving section that receives a first radio signal transmitted according to a first communication system and a second radio signal transmitted according to a second communication system;
a first detection section that detects the first radio signal among radio signals received by the radio receiving section according to the first communication system;
a second detection section that detects the second radio signal among radio signals received by the radio receiving section using a predetermined correlation threshold according to the second communication system;
a threshold setting section that sets the predetermined correlation threshold of the second detection section to a first value when only the second radio signal is awaited, and sets the predetermined correlation threshold of the second detection section to a second value larger than the first value when the first radio signal and the second radio signal are awaited, wherein the predetermined correlation threshold represents a cross correlation between the second radio signal and a portion of a preamble signal of the second radio signal; and
a data processing section that processes, based on a temporal order of the first and second radio signals being detected according to the respective first or second communication system, one of a first decoded signal corresponding to the first radio signal or a second decoded signal corresponding to the second radio signal.

8. A receiving method, comprising the steps of:
receiving a first radio signal transmitted according to a first communication system or a second radio signal transmitted according to a second communication system;
detecting a first segment of the first radio signal of the received first radio signal or the received second radio signal according to the first communication system;
changing temporarily a correlation threshold for detecting the second radio signal when the first segment of the first radio signal is detected according to the second communication system, wherein the correlation threshold represents a cross correlation between the second radio signal and a portion of a preamble signal of the second radio signal;
detecting a first segment of the second radio signal of the received first radio signal or the received second radio signal using the temporarily changed correlation threshold; and
processing, based on a temporal order of a second segment of the first radio signal and a second segment of the second radio signal being detected according to the respective first or second communication system, one of a first decoded signal corresponding to the first radio signal or a second decoded signal corresponding to the second radio signal, wherein detecting the first segment of the first radio signal comprises detecting a portion of a preamble signal of the first radio signal, detecting the first segment of the second radio signal comprises detecting the portion of a preamble signal of the second radio signal, detecting the second segment of the first radio signal comprises detecting the whole preamble signal of the first radio signal, and detecting the second segment of the second radio signal comprises detecting the whole preamble signal of the second radio signal, and wherein the data processing section performs processing for the first decoded signal if detection of the second segment of the first radio signal occurs prior to detection of the second segment of the second radio signal, and performs processing for the second decoded signal if detection of the second segment of the second radio signal occurs prior to detection of the second segment of the first radio signal.

9. The receiving apparatus according to claim 7, wherein the first detection section performs primary detection to detect a portion of a preamble signal of the first radio signal and performs secondary detection to detect the whole preamble signal of the first radio signal, and the second detection section performs primary detection to detect the portion of the preamble signal of the second radio signal and performs secondary detection to detect the whole preamble signal of the second radio signal.

10. The receiving apparatus according to claim 9, wherein the data processing section performs processing for the first decoded signal if secondary detection of the first radio signal by the first detection section occurs prior to secondary detection of the second radio signal by the second detection section, and performs processing for the second decoded signal if secondary detection of the second radio signal by the second detection section occurs prior to secondary detection of the first radio signal by the first detection section.

11. The receiving apparatus according to claim 7, wherein the first communication system is a direct sequence spread spectrum system.

12. The receiving apparatus according to claim 7, wherein the second communication system is an orthogonal frequency division multiplexing system.

13. The receiving method according to claim 8, wherein the first communication system is a direct sequence spread spectrum system.

14. The receiving method according to claim 8, wherein the second communication system is an orthogonal frequency division multiplexing system.

\* \* \* \* \*